US 6,560,614 B1

(12) United States Patent
Barboy et al.

(10) Patent No.: US 6,560,614 B1
(45) Date of Patent: May 6, 2003

(54) NONINTRUSIVE UPDATE OF FILES

(75) Inventors: Dimitry Barboy, Givataim (IL);
Leonid Kogan, Givataim (IL); Michael Zakharov, Givataim (IL); Leonid Shtilman, Givataim (IL)

(73) Assignee: XOSoft Inc., Cupertino, CA (US)

( * ) Notice: Subject to any disclaimer, the term of this patent is extended or adjusted under 35 U.S.C. 154(b) by 0 days.

(21) Appl. No.: 09/439,980

(22) Filed: Nov. 12, 1999

(51) Int. Cl.[7] ............................ G06F 12/00; G06F 17/30
(52) U.S. Cl. ........................ 707/201; 707/203; 707/8; 707/202; 707/204; 717/170
(58) Field of Search .................. 707/200–202, 707/203, 8, 204; 717/168–173

(56) References Cited

U.S. PATENT DOCUMENTS

| | | | | |
|---|---|---|---|---|
| 3,398,405 A | * | 8/1968 | Carlson et al. | 711/163 |
| 3,683,418 A | * | 8/1972 | Martin | 711/152 |
| 5,226,159 A | * | 7/1993 | Henson et al. | 707/8 |
| 5,274,808 A | * | 12/1993 | Miyao et al. | 717/11 |
| 5,359,730 A | * | 10/1994 | Marron | 717/11 |
| 5,434,994 A | * | 7/1995 | Shaheen et al. | 709/223 |
| 5,513,351 A | * | 4/1996 | Grantz | 707/200 |
| 5,555,418 A | * | 9/1996 | Nilsson et al. | 717/153 |
| 5,625,804 A | * | 4/1997 | Cooper et al. | 703/26 |
| 5,664,186 A | * | 9/1997 | Bennett et al. | 707/204 |
| 5,732,257 A | * | 3/1998 | Kullick et al. | 717/170 |
| 5,764,992 A | * | 6/1998 | Kullick et al. | 717/170 |
| 5,832,275 A | * | 11/1998 | Olds | 717/173 |
| 6,003,030 A | * | 12/1999 | Kenner et al. | 707/10 |
| 6,009,274 A | * | 12/1999 | Fletcher et al. | 717/173 |
| 6,055,546 A | * | 4/2000 | Pongracz et al. | 707/202 |
| 6,108,703 A | * | 8/2000 | Leighton et al. | 709/226 |
| 6,112,253 A | * | 8/2000 | Gerard et al. | 709/315 |
| 6,131,148 A | * | 10/2000 | West et al. | 711/162 |
| 6,192,376 B1 | * | 2/2001 | Kincaid et al. | 707/202 |
| 6,209,128 B1 | * | 3/2001 | Gerard et al. | 717/108 |
| 6,211,877 B1 | * | 4/2001 | Steele et al. | 345/804 |
| 6,327,584 B1 | * | 12/2001 | Xian et al. | 707/1 |

FOREIGN PATENT DOCUMENTS

| | | | | |
|---|---|---|---|---|
| JP | 63-201756 A | * | 8/1988 | G06F/15/00 |
| WO | WO 96/18947 A1 | * | 6/1996 | G06F/9/44 |
| WO | WO 97/14091 A1 | * | 4/1997 | G06F/9/06 |
| WO | WO 00/79384 A2 | * | 12/2000 | G06F/9/00 |

* cited by examiner

Primary Examiner—Jean R. Homere
Assistant Examiner—Luke S. Wassum
(74) Attorney, Agent, or Firm—Hale & Door LLP

(57) ABSTRACT

Updating a file which is currently open is accomplished by allowing current users to continue accessing the original file while redirecting new users to an updated version. When user activity permits, the updated version is substituted for the original file. An auxiliary program detects when a server application attempts to access an out-of-date file version and redirects the access call to the up-to-date file version. When no users are accessing the out-of-date file version, the up-to-date version of the file is substituted thereby allowing access to the most recent file version without creating errors for users who are accessing the older file version. New updates of files are transferred from a master site to a temporary location, accessible intermediate location, and finally to a permanent location.

26 Claims, 11 Drawing Sheets

NONINTRUSIVE UPDATE OF FILES

BACKGROUND OF THE INVENTION

1. Field of Invention

The present invention relates generally to the field of file system access and manipulation. More specifically, the present invention is related to maintaining files while they are open or in use.

2. Discussion of Prior Art

One of the greatest characteristics of current electronic and magnetic storage media and systems is the ease and speed with which changes can be accomplished. File systems having hundreds, even thousands, of files are easily updated to reflect minor or major changes through standard interactions between user applications and modern operating systems.

One area where this ability is greatly utilized is client/server applications in which a server application provides access to or data from files which are frequently updated. In this environment, the data rapidly fluctuates and the server application's accuracy and usefulness depend on its ability to provide the most up-to-date information without errors.

The prior art has failed to adequately address the issues and difficulties of updating files while simultaneously providing access to those files. If a file is updated while a user is accessing it, then the user may receive inaccurate data (garbage) or find themselves in an inoperative processing environment (hung application). The common prior art methods of addressing this problem include 1) stopping the server application, updating a file and then restarting the server application or 2) storing the updated file in a temporary location and whenever the server application restarts, replacing the out-of-date file.

While these prior art solutions do prevent conflicts from occurring when updating files which are being accessed, they require a stop and restart of the server application to accomplish their goal.

Whatever the precise merits, features and advantages of the prior art, it fails to achieve or fulfill the purposes of the present invention. In particular, the prior art does not provide for a file update method which allows access to an updated file while concurrently preserving open connections to a previous version of the file, all without a system or application restart.

SUMMARY OF THE INVENTION

A master site maintains up-to-date copies of files which it provides to a number of mirror sites. Each mirror site is responsible for receiving the file updates and integrating them while continuing to provide service to those and other files (FIG. 1a). The invention involves temporarily storing an updated file, moving it to an intermediate location, redirecting calls to the out-of-date file to the intermediate location, and moving the intermediate file to its permanent location when user activity permits (FIG. 1b). Of particular importance is the redirection of file accesses by using a monitoring program to inject substitute operating system (OS) library calls into the running application which handle calls to the out-of-date file version.

DESCRIPTION OF THE PREFERRED EMBODIMENTS

Figure 1A:
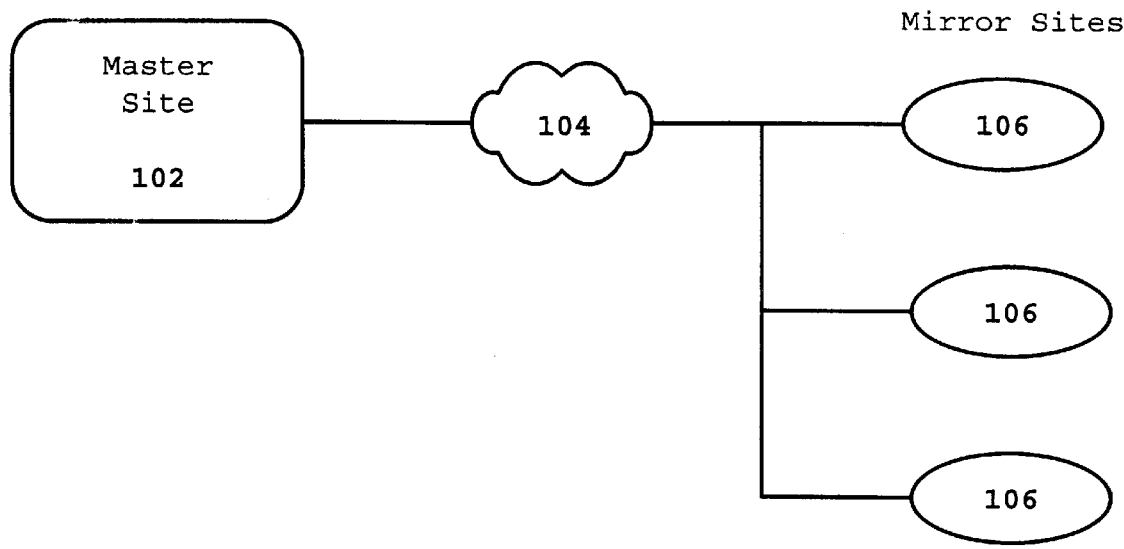
FIGS. 1a and 1b illustrate an overview of the architecture and method of the present invention.

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as a exemplification of the principles of the invention and the associated functional specifications of the materials for its construction and is not intended to limit the invention to the embodiment illustrated. Those skilled in the art will envision many other possible variations within the scope of the present invention.

Figure 1B:
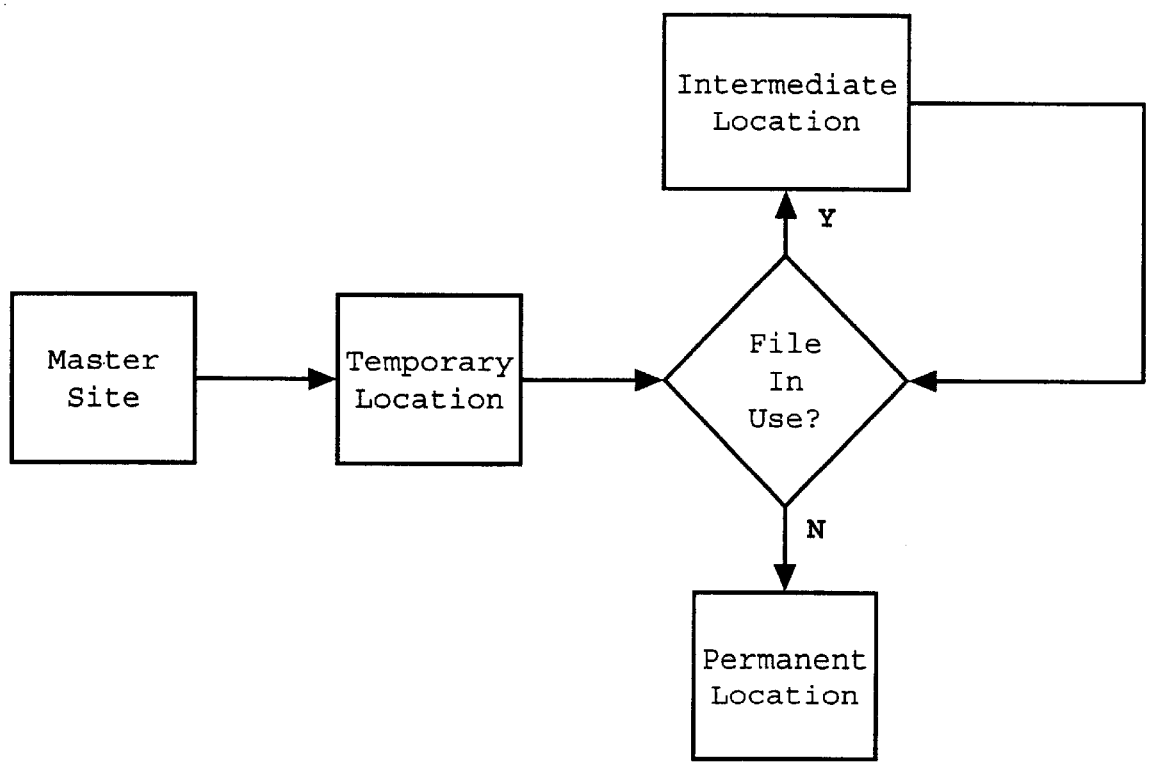

FIG. 1 illustrates the general architecture of the present invention. Master site 102 contains original copies of a number of data files. In a preferred embodiment, users may or may not access master site 102 to obtain these files, while the files are distributed to mirror sites 106 where they are accessible by users. An administrator introduces changes to files on master site 102 and then updated copies are replicated to mirror sites 106.

As depicted in FIG. 1, the sites 102 and 106 are connected by network 104. The present invention contemplates network 104 as a LAN, an intranet, and even the Internet. One example of the system in FIG. 1 is a web site having geographically distributed servers. Master site 102 contains the data and other pages which users will eventually access and on each mirror site 106, a web server is running which responds to requests from web browsers. The data and other files are routinely updated and forwarded across network 104 so that mirror sites 106 always provide the most current information.

While the preferred embodiment is depicted in FIG. 1 as a distributed architecture, the present invention contemplates within its scope a single system as well. In this alternative, where master site and mirror site are the same system, connection 104 is a bus or storage area network or other functionally equivalent media.

While it is important to have current information, it is just as important to prevent these updates from interfering or degrading the performance of the web servers. The present invention provides a method of ensuring that updated files are available at remote sites 106 without interfering with a user currently accessing the site.

While the example given describes a web server running on remote sites 106, the present invention contemplates within its scope other server applications which service client calls for files such as FTP servers, etc.

Figure 2:
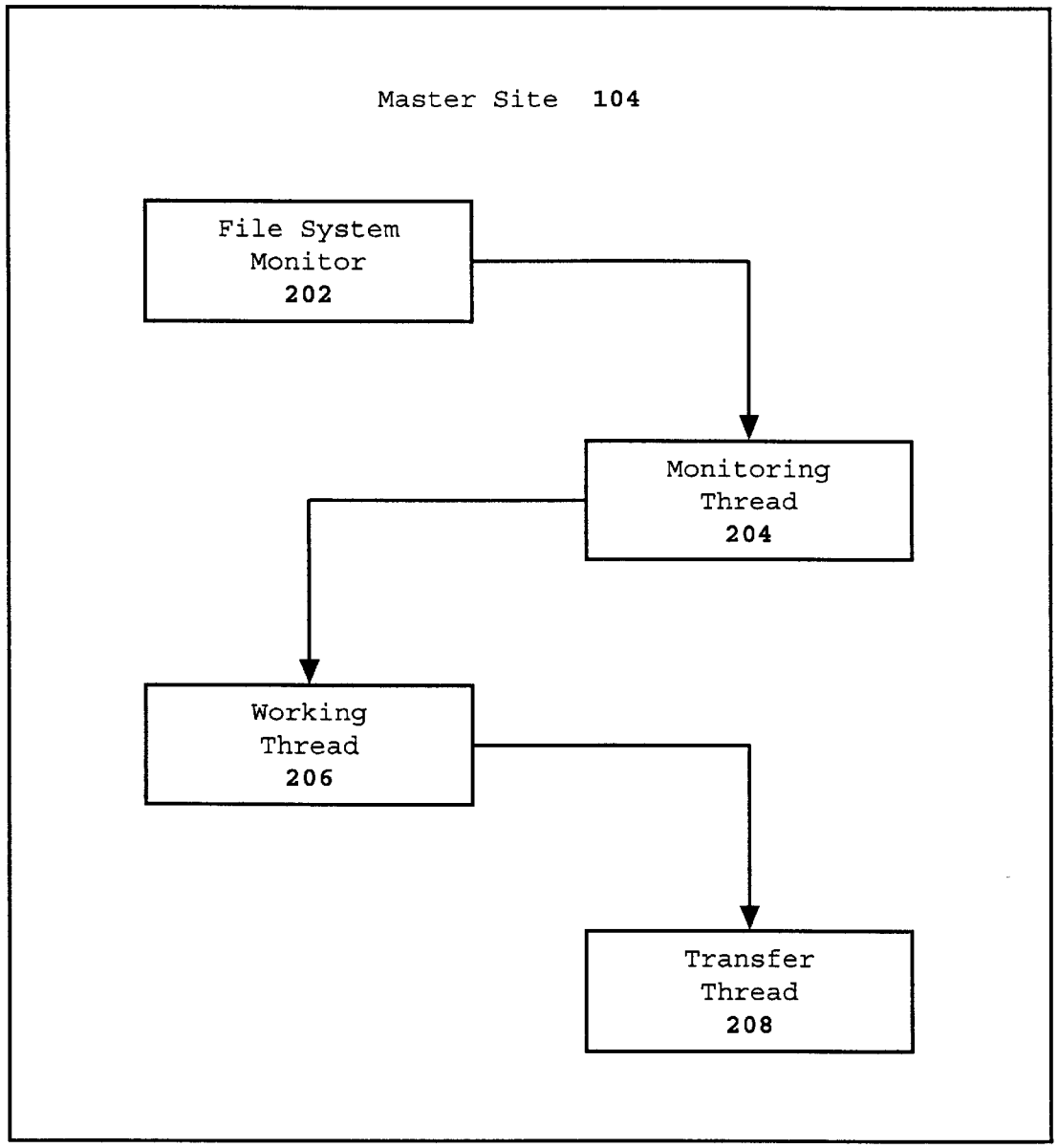
FIG. 2 illustrates the major threads (Monitoring, Working, and Transfer) which execute on the master site of the present invention.

FIG. 2 illustrates an overview of the flow of the application running at master site 102. A file system monitor 202 runs on site 102. Main thread starts Monitoring thread 204 which determines if any files have been updated, Working Thread 206 which generates a list of all changes that have occurred, and Transfer Thread 208 which performs the transfer of any updated files between master site 102 and mirror sites 106.

Figure 3:
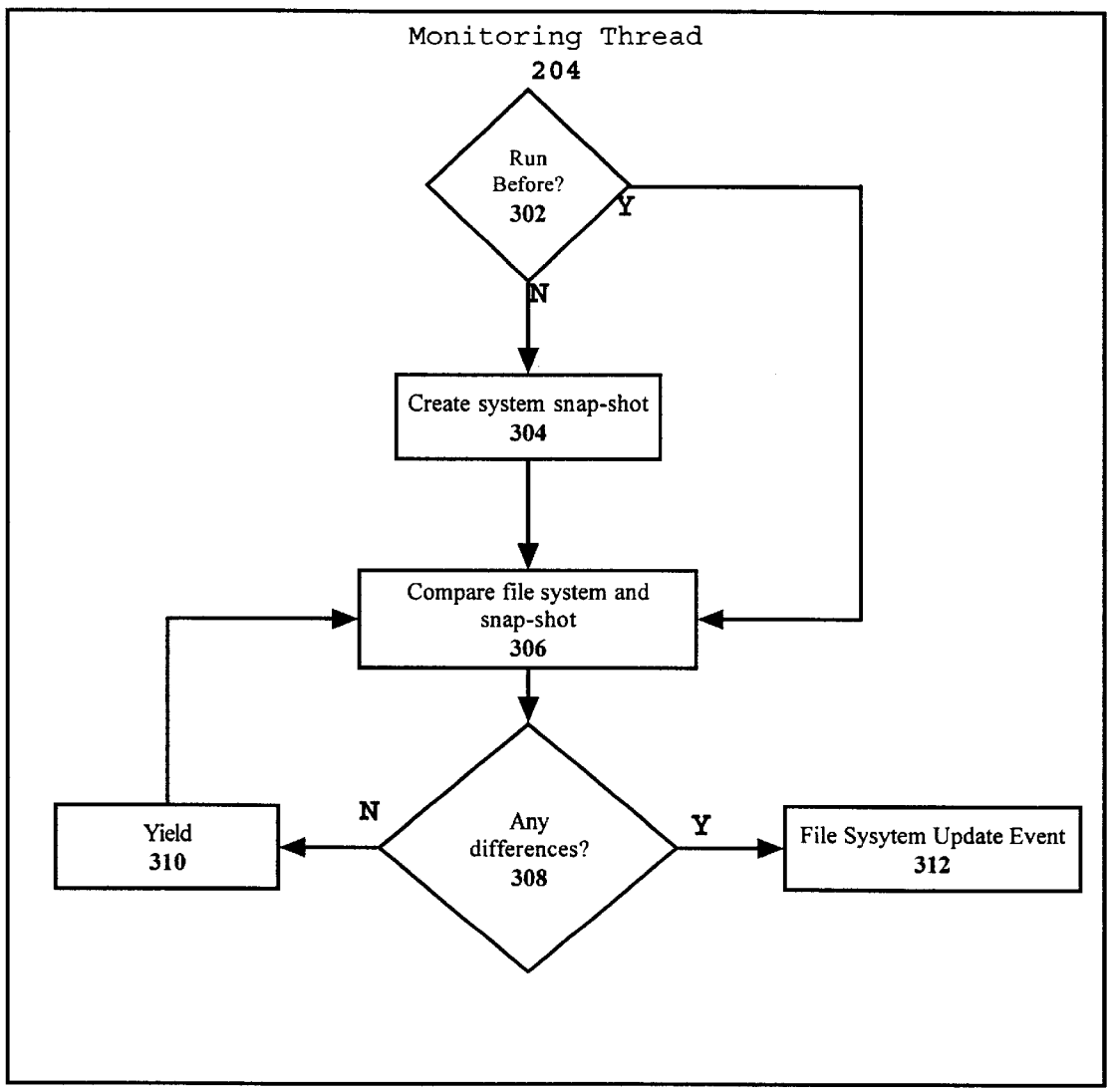
FIG. 3 illustrates the details of the Monitoring Thread of the present invention.

FIG. 3 illustrates the details of Monitoring Thread 204. This executing thread first determines if it has ever been run before 302. If not, then it creates a file system snapshot 304; if it has been run before, then it proceeds to step 306. In step 306, this thread compares the current file system state with the file system snapshot to determine if there have been any recent changes 308. Possible changes include modification of files, file names, file attributes, access rights, dates, etc. If there are no changes, then the thread enters a wait state (Yield 310) until the OS periodically gives the thread another time slice. At every time slice given by the OS, step 306 is repeated in order to detect file systems changes.

If there have been changes, then a file system update event 312 is signalled to Working Thread 206.

Figure 4:
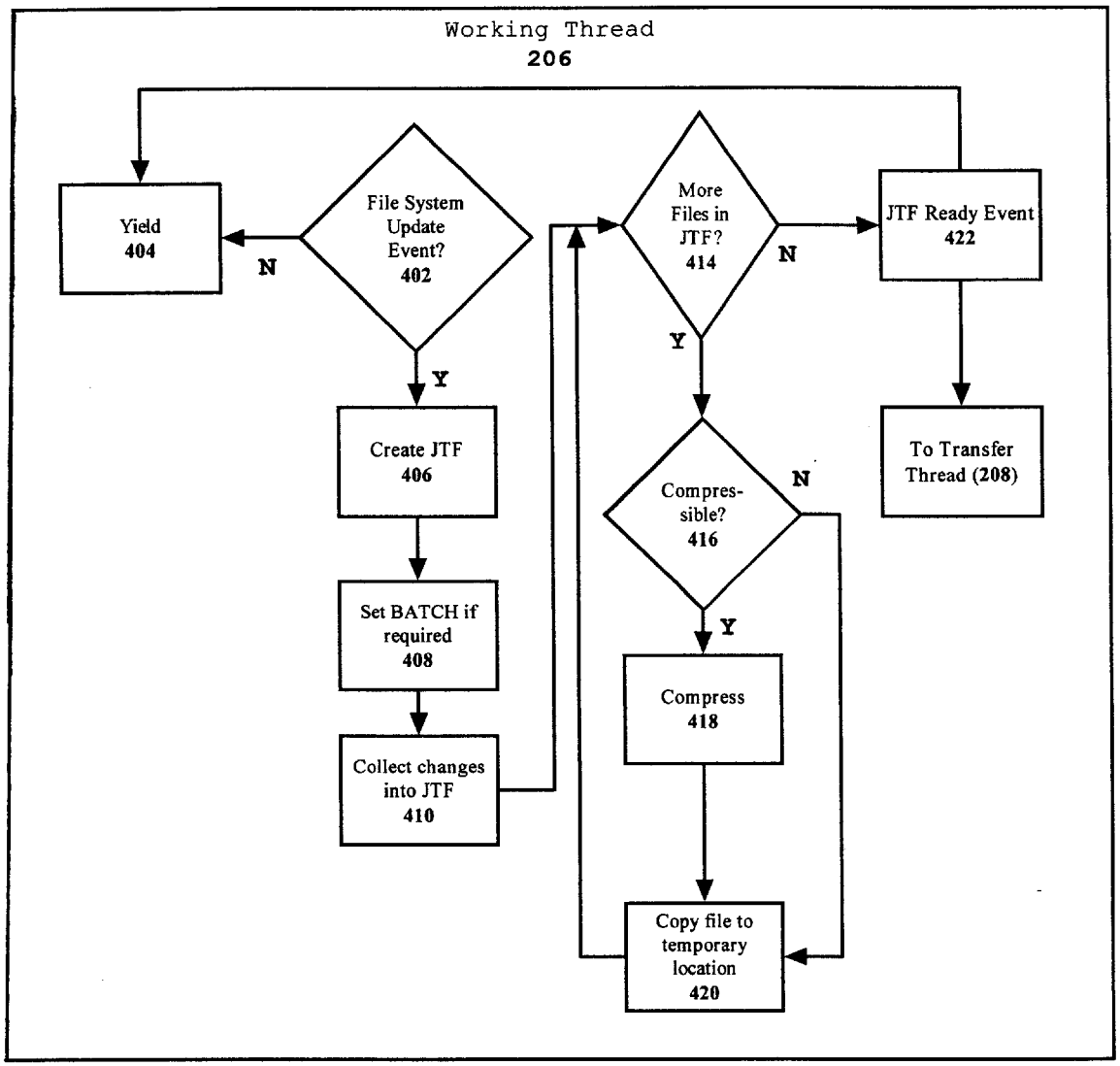
FIG. 4 illustrates the details of the Working Thread of the present invention.

The details of Working Thread 206 are depicted in FIG. 4. This thread tests 402 and waits 404 until a file system update event 312 occurs. Once a file system update event 312 is signalled, the thread creates a Job Task File (JTF) 406. Step 406 collects the information regarding the detected file system changes and has a unique ID which is used later to perform fault inquiry and acknowledgment.

In the preferred embodiment, a GUI of the file monitoring process (not shown) which owns Working Thread 206 has the ability to set a BATCH bit or flag. By setting this flag, the user specifies that all files listed in a JTF must either be successfully transferred to a mirror site or be discarded in the event of a transfer fault.

In step 408 the thread determines if the BATCH flag has been selected and sets the BATCH attributes of the JTF if required.

For each file in the JTF 414, the thread determines if the file can be compressed 416. The typical manner of testing files is to investigate the first few bytes, or "magic number" of a file, to determine if it is compressible or not. If not, then the file is stored in a temporary location 420; if it is compressible then the file is first compressed 418 and then stored in temporary location 420. After all files in the JTF are temporarily stored, a JTF Ready Event is signalled 422 to Transfer Thread 208.

An alternative embodiment, well within the scope of the present invention, is to omit compression test step 416 and compression step 418 and transfer all files in an uncompressed format.

Figure 5:
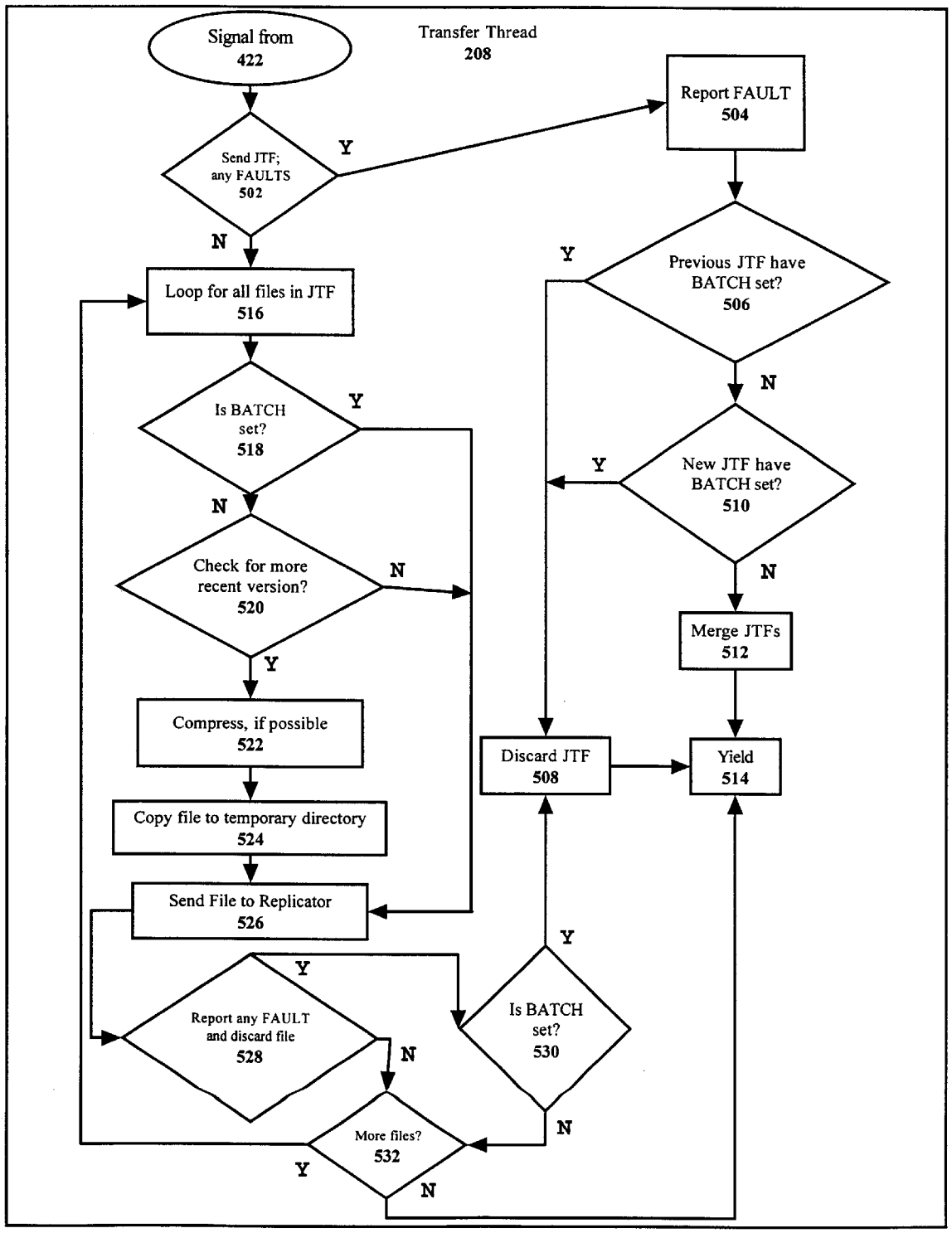
FIG. 5 illustrates the Transfer Thread of the present invention.

Transfer Thread 208 is responsible for transferring the files in the JTF to mirror sites 106; the details of this thread are illustrated in FIG. 5 as described below.

Upon receiving a JTF Ready Event 422, this thread starts by sending the JTF to the mirror sites 502. If sending the JTF fails, then a fault report is generated 504. Previous JTFs which failed during transfer are not necessarily discarded and are available for transfer with each new JTF Ready Event 422. However, previous JTFs which have the BATCH attribute set are identified 506 and discarded 508. Furthermore, if the newest JTF, which just failed, has its BATCH attribute set 510 then it too must be discarded 508. As indicated in the discussion with respect to FIG. 4, the setting of the BATCH attribute is a way of indicating that if a transfer should fail, then that JTF should be discarded.

If no BATCH attributes are set then the newest JTF is merged with previous JTFs that also failed 512. Upon discarding JTFs 508 or merging JTFs 512 the thread enters a wait state (Yield 514) until the next JTF Ready Event 422 is signalled.

If, however, the JTF is successfully transferred to mirror site 106, then transfer of the files identified within JTF begins. Within Transfer Thread 208 a loop steps through each file in the JTF and replicates them to remote sites 106. While there are more files to be transferred in the JTF 516, the thread loops for each file.

Because the preferred environment for the present invention is a multi-tasking, multi-threaded OS, the possibility exists that other executing processes have subsequently updated a file that is about to be replicated to remote site 106.

If the BATCH attribute is set 518, for the JTF then the file is simply sent to mirror site 526 without any further tests.

If however, the BATCH attribute is not set, then the thread checks monitoring thread 204 and working thread 206 to determine if an even newer version of the file exists 520. If a newer version does exist, it is compressed 522, if possible, and stored 524 in the temporary location, similar to step 420 and then sent to the mirror site 526. If a newer version does not exist, then there is no need to check for compression opportunities and execution proceeds by sending the file to mirror site 526.

If a fault occurs during transfer, the thread is notified 528 and, depending on whether or not the BATCH attribute is set 530, either the file is discarded 528 and the next file is processed 532 or the entire JTF is discarded 508 and wait state 514 is entered.

Once all files have been transferred, execution proceeds to wait state (Yield 514).

Figure 6:
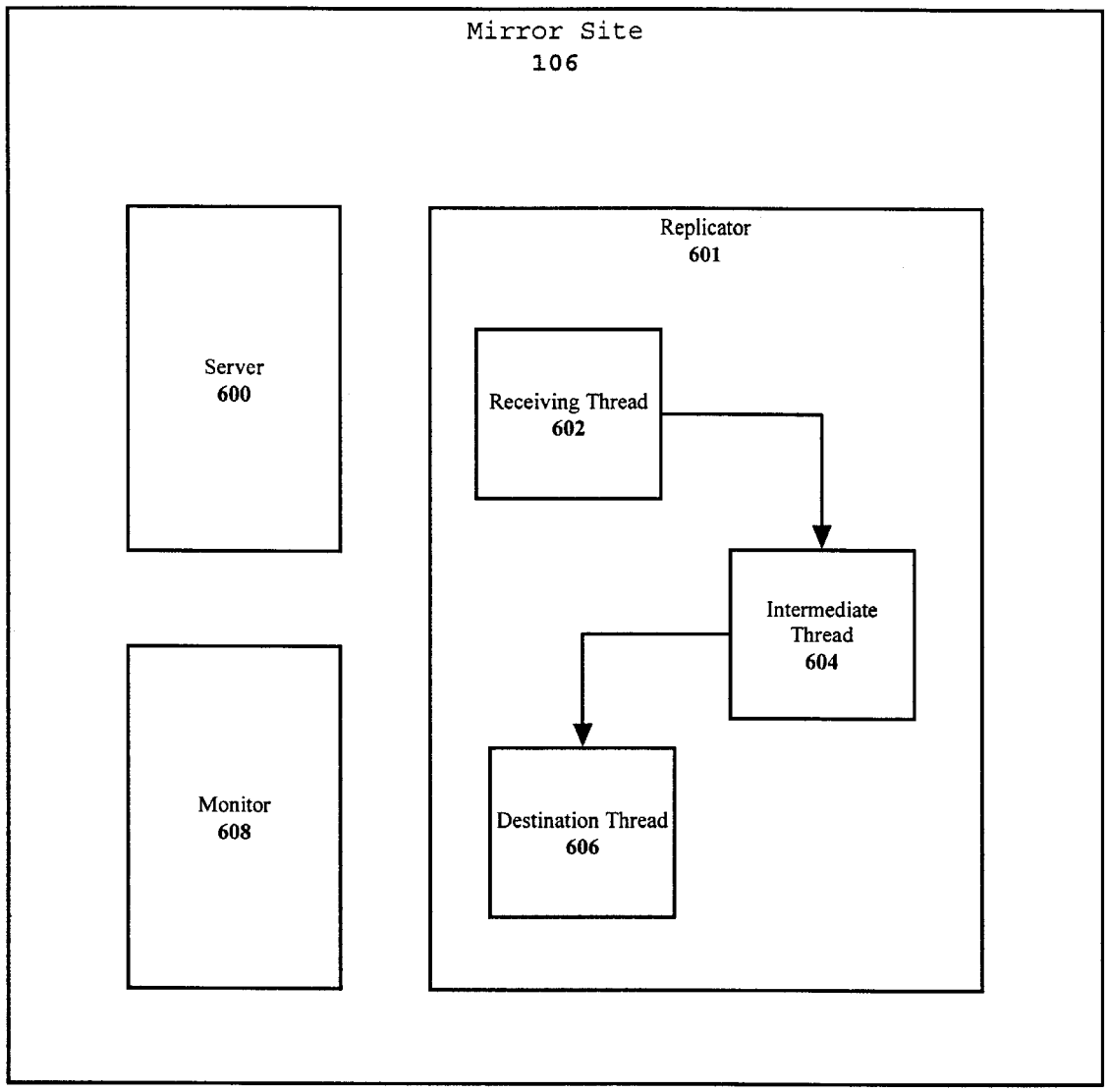
FIG. 6 illustrates the major processes and threads (Receiving, Intermediate, and Destination) which execute on the mirror sites of the present invention.

FIG. 6 illustrates the general architecture of the processes of the present invention which execute on mirror sites 106. At these sites, the update files must be received properly and integrated into new user requests without interfering with existing file requests. While only a single mirror site is depicted in this figure, the present invention contemplates multiple mirror sites, as shown in FIG. 1.

Server application 600, which in a preferred embodiment is a web server, is running and handles client requests for files and data that are subject to periodic updating from master site 102. Replicator 601 is the main process for handling the receipt and manipulation of updated files. Receiving Thread 602 is responsible for receiving and temporarily storing files received from master site 102. After files are received, Intermediate Thread 604 moves the files into a location where server 600 is able to use them to fulfill new user requests. Finally, Destination Thread 606 determines when user activity permits the update files to be transferred to their permanent locations. Also running at remote sites 106 is Monitor 608 which determines if server 600 is running and injects code into the process space of server 600.

Figure 7:
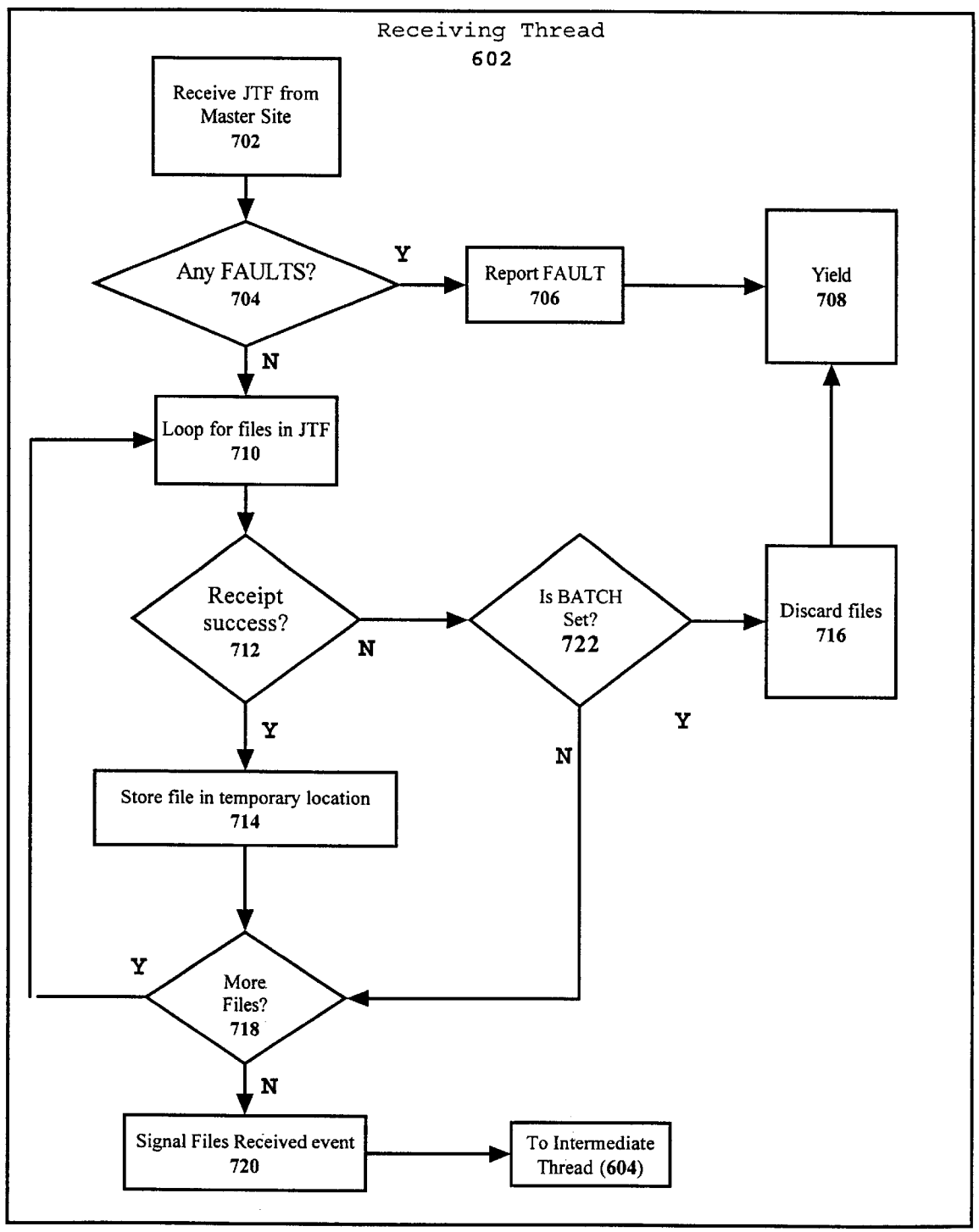
FIG. 7 illustrates the Receiving Thread of the present invention.

At site 106, Receiving Thread 602 is created to receive incoming files being sent by master site 102. Receiving Thread 602 is always in existence, but is waiting and simply becomes active when incoming files appear. The details of this thread are provided in FIG. 7 as described below.

JTFs are received from master site 102 in step 702. Successful completion of JTF receipt is tested 704; if required, faults are reported 706 both internally and to master site 102 and the thread proceeds to wait state (Yield 708).

Upon successful JTF receipt, however, loop 710 is entered in order to receive all files identified in the JTF.

In loop 710 each file is received 712 and, if successful, the file is stored in a temporary location 714. The preferred embodiment includes file compression when possible; therefore, part of successful file receipt is file decompression when required. If the file reception is not successful, then a fault is reported and the subsequent steps depend on whether or not the BATCH attribute is set 722 for the JTF being processed. If the BATCH attribute is set, then a fault with the reception of any of the files requires that all files be discarded 716 and the thread is halted (Yield 708). If the BATCH attribute is not set, then only the faulty file is ignored and processing continues with the next file (More Files 718). After all files in the JTF have been received, Receiving Thread 602 signals a File Received Event 720.

Figure 8:
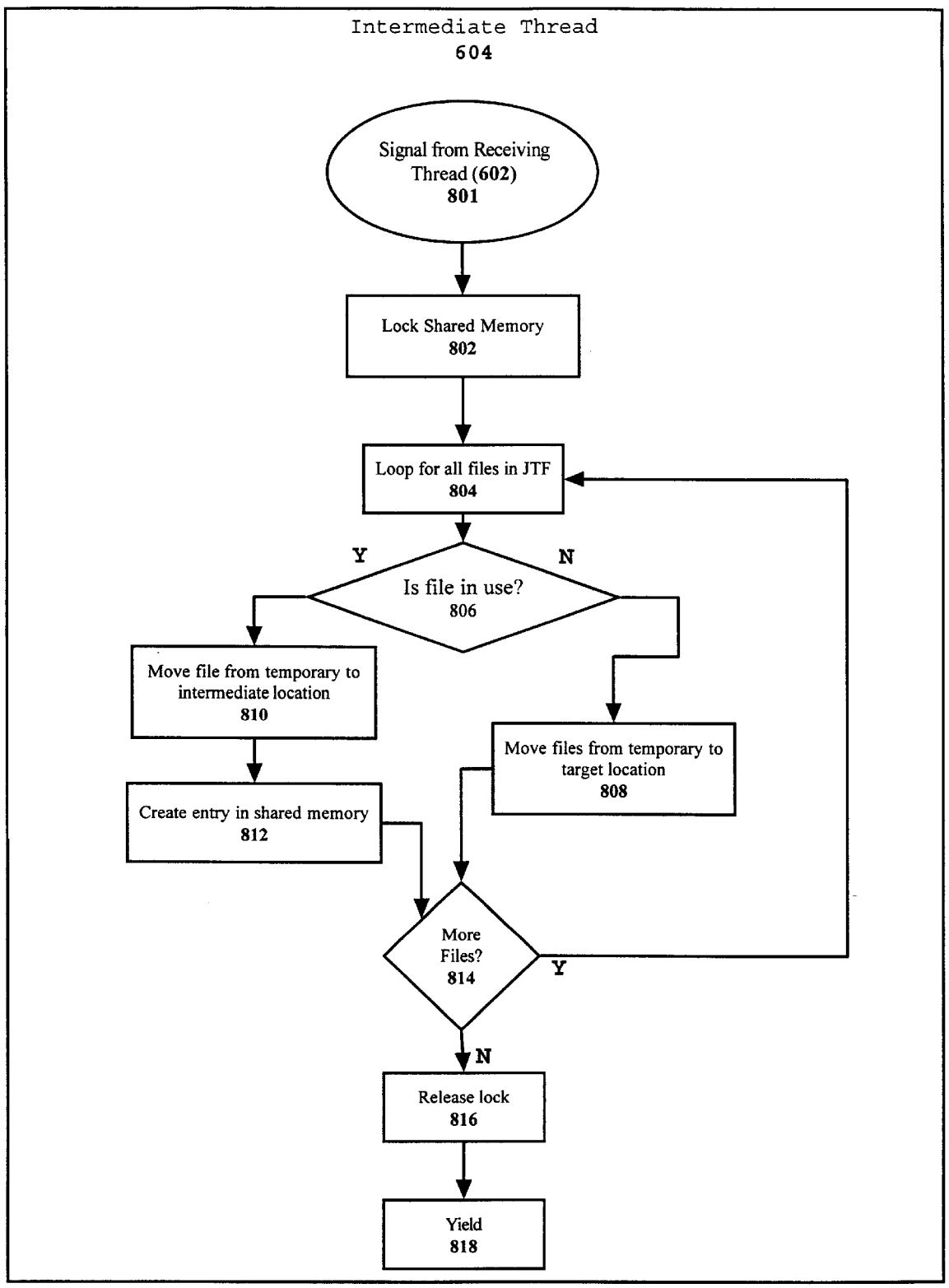
FIG. 8 illustrates the Intermediate Thread of the present invention.

The Files Received Event signal 720 activates Intermediate Thread 604 as depicted in FIG. 8. In step 802, this thread locks a shared memory location which eventually holds a list of files which need to be updated on mirror sites 106. This particular shared memory is hereinafter referred to as the substitution queue. Both semaphores and mutexes are methods of locking shared memory contemplated within the scope of the present invention.

A loop 804 is then entered for all files in the JTF. First, the thread, using standard OS service calls, determines if the current version of that file is presently in use 806. If the file is not in use, then there are no current users to be concerned with and the file is moved from the temporary area to its permanent location 808.

The preferred method of moving the file is to rename the temporary file with its corresponding permanent file name. Doing this is much quicker than re-copying the temporary file to the permanent location and then deleting the temporary file.

If, however, the file is in use then it can not be replaced or the present users would be adversely affected. The file, therefore, is moved from the temporary location, not to its permanent location, but to an intermediate location 810 and an entry in the substitution queue is created 812. In a preferred embodiment, the queue entry for each file contains its full, permanent path and name as well as its full, intermediate path and name.

The loop then repeats for all files in the JTF 814. Finally, the shared memory lock is released 816 and the thread waits (Yield 818) for the next Files Received Event 720.

With the presence of the updated versions of files now in their intermediate location, the methods of the present invention for utilizing these updated files to service data requests will now be introduced. Using the methods of the present invention, the most up-to-date version of a file is used to handle new requests in a manner which does not interfere with users having open requests being serviced by the now-obsolete version of the file. Also, the temporary location is itself free to receive even a more current update to the file.

In a preferred embodiment, Monitor 608 detects the presence of a web server using OS specific functions to determine if the web server is running. Most multitasking systems provide methods for one process to examine the list of all processes executing on the same (or even different) machines and identify whether or not a specific process is present. Therefore, while a preferred embodiment of Monitor 608 checks for a web server, the present invention's scope encompasses the ability to detect other types of servers and processes as well. When Monitor 608 first starts running, it checks for the presence of server 600. If server 600 is not present, then Monitor 608 goes into a wait mode where it periodically wakes-up and checks for the presence of server 600.

When the presence of server 600 is detected, Monitor 608 injects substitute code, or function calls, into server process 600. A preferred method, in a Windows™ environment is to use an InjectLib method which, for example, is described in *Advanced Windows*, 3ed., by Jeffrey Richter published in 1996. Alternatively, UNIX-like operating systems have other methods of injecting code from one process's space into another's. The end result, in. either instance, is that Monitor 608 substitutes its own code for functions called from within server 600.

In particular to the present invention, the calls of server 600 which are replaced are those system calls which open and close files. For example, in a Windows NT™ environment, the standard OS calls "CreateFile" and "CloseHandle" are replaced. The substitute calls which Monitor 608 injects into server 600 add some additional functionality to those standard OS calls as illustrated in FIGS. 9a and 9b.

Figure 9A:
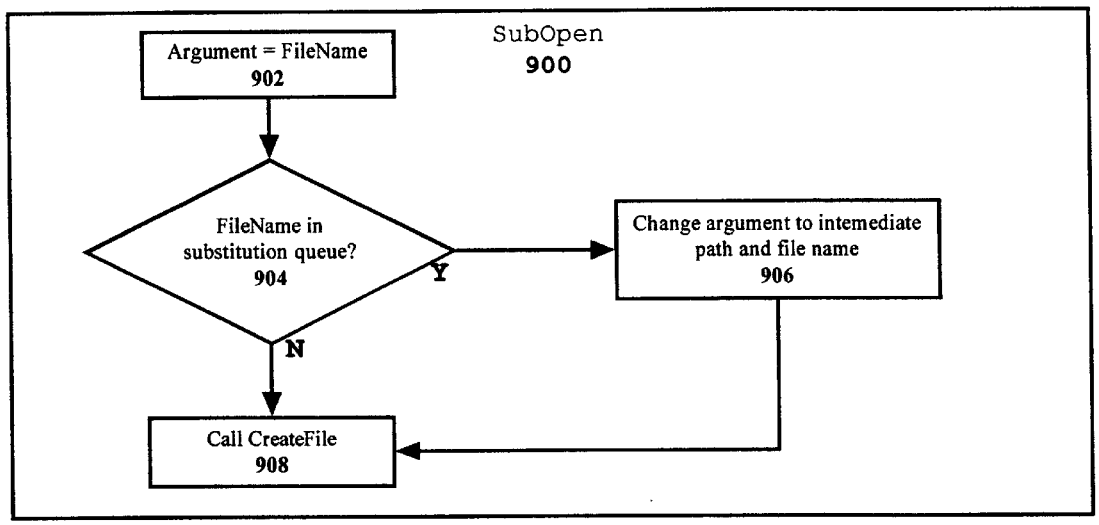
FIG. 9 illustrates the details of function calls substituted by the present invention.
Figure 9B:
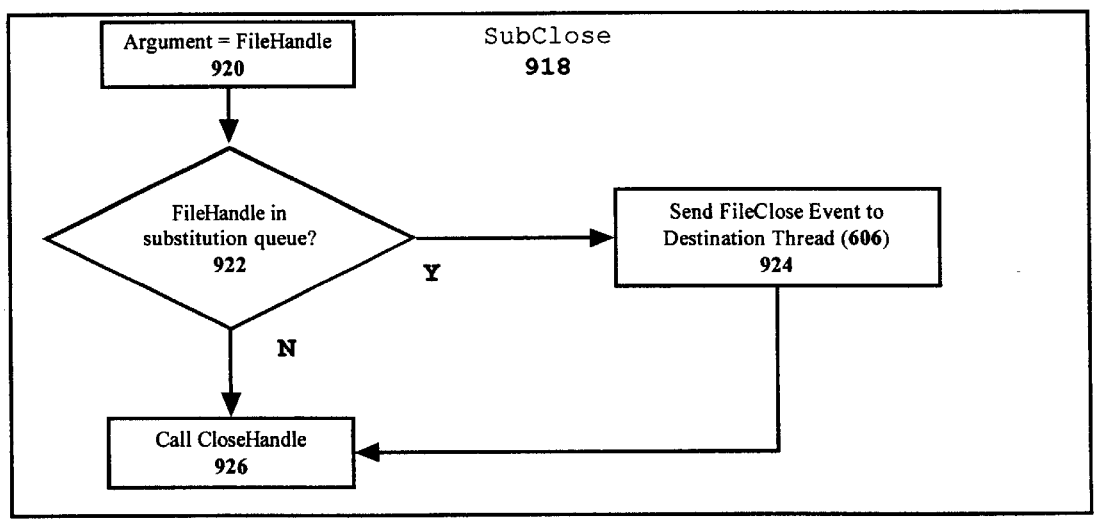

In place of CreateFile, Monitor 608 substitutes SubOpen 900 as depicted in FIG. 9a. Server 600 upon receiving a user's request for a file calls "CreateFile" in order to open the file and provide its data. With the injection of this substituted function, however, when server 600 tries to call CreateFile, with a file name as an argument, the substitute code is passed that argument 902 and checks to see if that filename exists in the substitution queue 904. In particular, the substitution queue holds a list of files that have been received from master site 102 and need to be updated at mirror site 106. This queue was earlier described as the substitution queue updated in step 716 wherein each entry has the intermediate path and file name as well as the permanent path and file name. If the argument (the permanent path and filename) does not exist in the substitution queue, then no update file exists and CreateFile is simply called with "filename" as an argument and server 600 continues as usual.

However, if the filename does exist in the substitution queue, then the system knows an updated version is present at mirror site 106 and that this version is in the intermediate location. Thus, in step 906, the argument to pass to CreateFile is changed from the file name passed by server 600 to the intermediate file name found in the substitution queue; and with this new argument, CreateFile is then called in step 908 and server 600 continues as usual.

Also replaced by Monitor 608 is server's 600 call to CloseHandle. The substituted function, SubClose, is depicted in FIG. 9b.

When server 600 calls CloseHandle, also passing a file handle as an argument, the substituted function SubClose 918 is actually executed. First, SubClose 918 receives the file handle argument 920, retrieves corresponding file name from the OS and determines if the filename is one of the files listed in the substitution queue 922. If the filename is not in the substitution queue, then CloseHandle is simply called with the file handle argument 926 because no special processing is required for that particular file close operation.

If, however, the filename is in the substitution queue, then this indicates that an updated version of the file exists in the intermediate area and ultimately needs to be substituted for the out-of-date version. The SubClose function 918, therefore signals a FileClose Event 924 to Destination Thread 606 before calling CloseHandle 926. The FileClose Event signal 924 includes as an argument the filename so that Destination Thread 606 is aware of which file is being closed.

Figure 10:
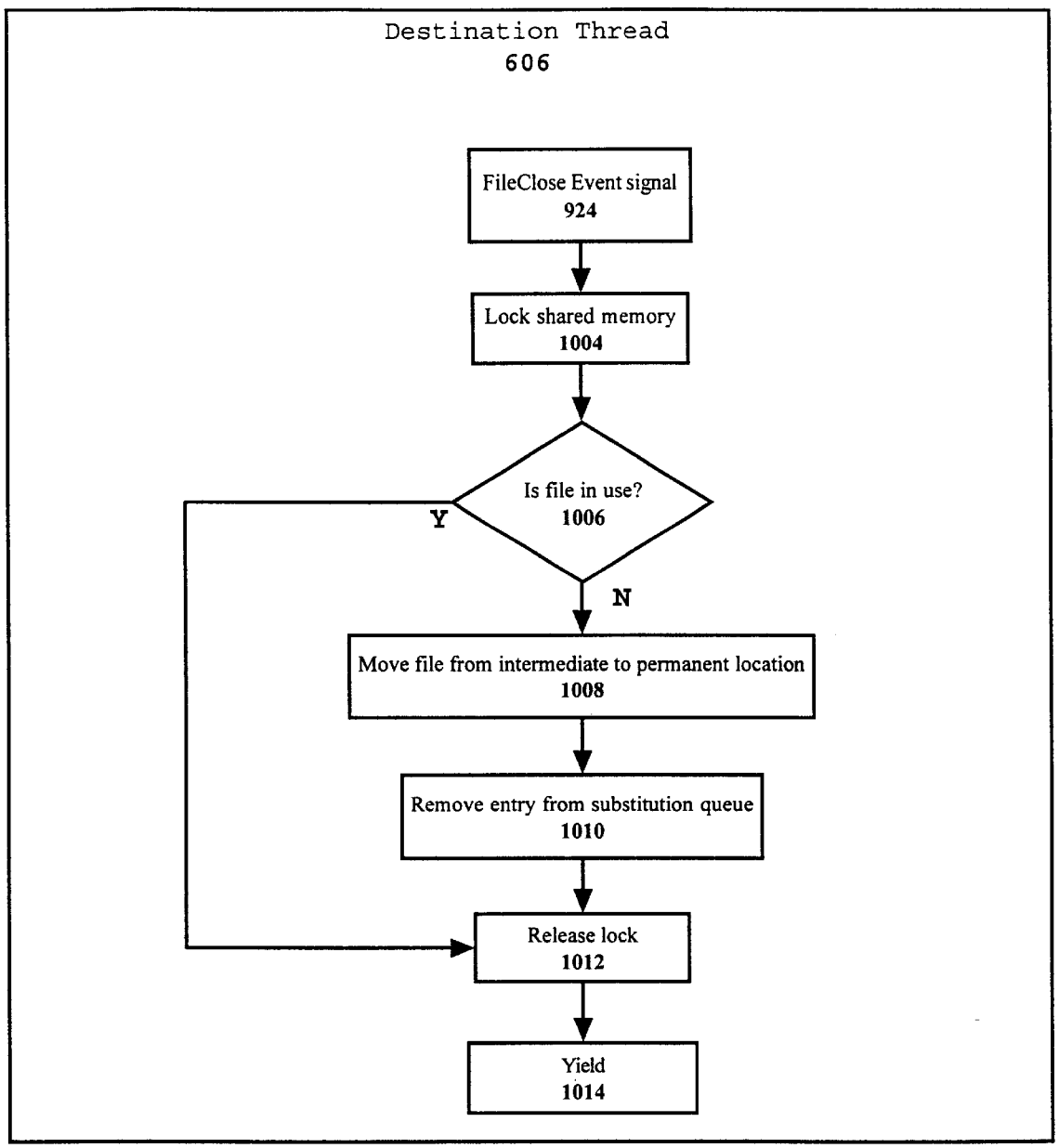
FIG. 10 illustrates the Destination Thread of the Present Invention.

Destination Thread 606 is responsible for determining when user activity on server 600 will allow an intermediate file to finally be moved to its permanent location. FIG. 10 illustrates the details of this thread and is described below.

Destination Thread 606 is entered whenever a FileClose Event is signaled 924 and locks the shared memory 1004. The filename passed by FileClose Event signal 924 is used to determine, using standard OS system calls, whether or not the filename is in use 1006.

If the filename is not in use, then this means that the most recent FileClose Event signal was in response to the last user to have the filename open finally being finished with the file and closing it. Since there are no more users accessing this filename, the thread replaces the out-of-date version, at the target location, with the up-to-date version, at the intermediate location 1008. As described earlier, renaming the files is accomplished much quicker than actual copying then deleting the files. Conveniently, the substitution queue holds the necessary information to perform this file renaming.

During the time when a file version existed in both the intermediate and permanent locations, the current invention allows an even newer version to be stored in the temporary location. If all three locations have a version of a file, then step 1008 not only transfers the version from the intermediate to the permanent location, but also transfers the version in the temporary location to the intermediate location.

Once the target file is the most up-to-date file, the corresponding record is purged from the substitution queue 1010. The shared memory lock is released in step 1012 and the thread waits for the next FileClose Event signal (Yield 1014).

The other possibility to the above scenario is that Destination Thread 606 determines the filename is still in use even though one FileClose Event signal was received. In this instance, there are current users of the out-of-date version and it cannot be replaced yet. Destination Thread 606 then releases the shared memory lock 1012 and waits for the next FileClose Event signal 1014.

Figure 11:
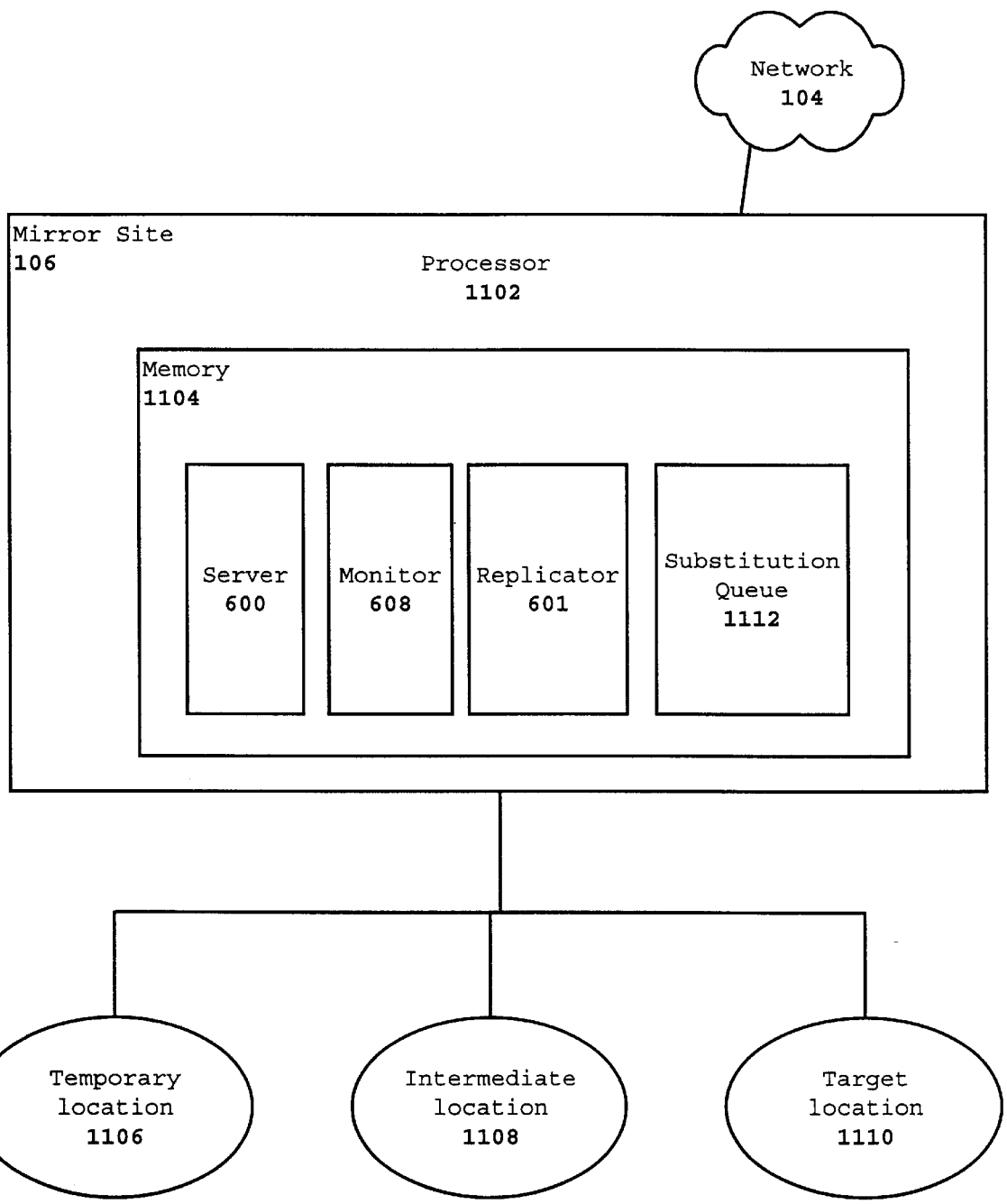
FIG. 11 illustrates a n architecture of a mirror site system of the present invention.

FIG. 11 illustrates a computer system implementing the mirror site functionality of the present invention. A processor 1102 runs a multi-tasking OS which controls three applications of interest in memory 1104.

As described earlier, server 600 services client requests received from users over network 104. Monitor 608 detects the presence of server 600 and substitutes certain function calls into server 600 process space. Replicator 601 is responsible for shuttling file versions between temporary 1106, intermediate 1108, and permanent locations 1110; substitution queue 1112 is utilized to assist these file movements.

CONCLUSION

A system and method has been shown in the above embodiments for the effective implementation of a method for non-intrusive updating of files. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by operating system, server application, file system architecture, computer hardware, network architecture, network topology, file transfer protocol, function code injection method or compression algorithm. In addition, the present invention can be implemented locally on a single PC, connected workstations (i.e., networked-LAN), across extended networks such as the Internet or using portable equipment such as laptop computers or wireless equipment (RF, microwaves, infrared, photonic, etc.)

What is claimed is:

1. A method of updating a subject file stored in a target location in computer storage, comprising the following steps:

recognizing if an updated version of said subject file exists;

copying said updated version of said subject file to a temporary location;

determining if said subject file is presently being accessed to determine a use status;

if said subject file is not in use, copying said updated version from said temporary location to said target location;

if said subject file is presently in use, transferring said updated version from said temporary location to an intermediate location;

redirecting new requests for said subject file to said updated version located in said intermediate location, and wherein said determining step is repeated until said updated version is copied into said target location, said transferring to said intermediate location step occurring only during an initial determination of said use status and skipped for subsequent iterations of said determining step.

2. A method of updating a subject file as per claim 1, wherein access to said subject file is denied during transfer from said intermediate location to said target location.

3. A method of updating a subject file as per claim 2, wherein said denying step comprises a locking function of shared memory containing said intermediate location.

4. A method of updating a subject file as per claim 1, wherein said recognizing step further comprises a monitoring thread, said copying step further comprises a working thread, and copying to said temporary location step further comprises a transfer thread.

5. A method of updating a subject file as per claim 4, wherein said monitoring thread comprises the steps of creating a system snapshot, comparing said subject file with said snapshot, determining differences and, if differences exists, signaling the existence of an updated version of said subject file.

6. A method of updating a subject file as per claim 4, wherein said working thread comprises the steps of: recognizing said updated version, creating a job task file and associated ID, recognizing batch requirements, compressing of the updated version if compressible, and transference to said transfer thread.

7. A method of updating a subject file as per claim 6, wherein said transfer thread comprises the steps of: receiving and transferring said job task file and associated ID, detecting and reporting of faults, recognizing batch requirements, compressing of the updated version if compressible, and transference to said temporary location.

8. A method of updating a subject file as per claim 1, wherein said method repeats the steps for a plurality of subject files to be updated.

9. A method of updating a subject file as per claim 1, wherein said updated version of said subject file is stored in computer storage at a master site.

10. A method of updating a subject file as per claim 9, wherein said temporary, intermediate, and permanent locations are located remotely from said master site.

11. A method of updating a subject file as per claim 10, wherein said temporary, intermediate, and permanent locations are located remotely on a mirror site of said master site.

12. A method of updating a subject file as per claim 10, wherein said master site comprises a web site and said temporary, intermediate, and permanent locations are located remotely from said web site at one or more distributed web servers.

13. A method of updating a subject file as per claim 1, wherein said method of updating is implemented locally or remotely on one or more computer-based systems, across networks or existing communication mediums.

14. A method of updating a subject file as per claim 1, wherein said method of updating is implemented across networks element comprising any of LANs, WANs, cellular, Internet or Web based networks.

15. A computer media product implementing a method of updating a subject file stored in a target location, said computer media product comprising computer programmable code implementing:

recognizing if an updated version of said subject file exists;

copying said updated version of said subject file to a temporary location;

determining if said subject file is presently being accessed to determine a use status;

if said subject file is not in use, copying said updated version from said temporary location to said target location;

if said subject file is presently in use, transferring said updated version from said temporary location to an intermediate location;

redirecting new requests for said subject file to said updated version located in said intermediate location, and wherein said determining step is repeated until said updated version is copied into said target location, said transferring to said intermediate location step occurring only during an initial determination of said use status and skipped for subsequent iterations of said determining step.

16. A computer media product implementing a method of updating a subject file stored in a target location as per claim 15, wherein access to said subject file is denied during transfer from said intermediate location to said target location.

17. A computer media product implementing a method of updating a subject file stored in a target location as per claim 15, wherein said method repeats the steps for a plurality of subject files to be updated.

18. A computer media product implementing a method of updating a subject file stored in a target location as per claim 15, wherein said method of updating is implemented locally or remotely on one or more computer-based systems, across networks or existing communication mediums.

19. A method of updating a subject file as per claim 15, wherein said method of updating is implemented across networks element comprising any of LANs, WANs, cellular, Internet or Web based networks.

20. A method of updating a subject file as per claim 15, wherein said updating method is performed between a web site and one or more distributed web servers.

21. A system for updating a subject file while allowing continued access to said file, said system comprising:

an originating file location for an updated version of said subject file;

a temporary location for storing a copy of said updated subject file;

a determining element to indicate a positive or negative usage status of said subject file, the positive or negative usage status being a result of determining if said subject file is presently being accessed;

a destination file location receiving said copy of said updated subject file directly if said usage status is negative, if otherwise positive, an intermediate location for receiving an accessible copy of said updated subject file until said usage status is reversed to negative, thereby said destination file location receiving said copy of said updated subject file from said intermediate location, wherein said destination file location receives said copy only during an initial determination of said usage status and is skipped for subsequent iterations of said determination.

22. A system for updating a subject file while allowing continued access to said file, as per claim 21, wherein said originating file location comprises a master site.

23. A system for updating a subject file while allowing continued access to said file, as per claim 22, wherein said temporary, intermediate, and destination locations are located remotely from said master site.

24. A system for updating a subject file while allowing continued access to said file, as per claim 22, wherein said temporary, intermediate, and destination locations are located remotely on a minor site of said master site.

25. A system for updating a subject file while allowing continued access to said file, as per claim 24, wherein said mirror site further comprises: a shared memory, remote server software, new updated data available monitor, replicator and substitution queue.

26. A system for updating a subject file while allowing continued access to said file, as per claim 22, wherein said master site comprises a web site and said temporary, intermediate, and destination locations are located remotely from said web site at one or more distributed web servers.

* * * * *

UNITED STATES PATENT AND TRADEMARK OFFICE
CERTIFICATE OF CORRECTION

PATENT NO. : 6,560,614 B1
DATED : May 6, 2003
INVENTOR(S) : Dimitry Barboy et al.

Page 1 of 1

It is certified that error appears in the above-identified patent and that said Letters Patent is hereby corrected as shown below:

<u>Title page,</u>
Item [56], References Cited, please insert:

```
-- 4,954,941   9/1990   Redman          717/162
   5,155,837  10/1992   Liu et al.      709/221
   5,410,703   4/1995   Nilsson et al.  717/168
   5,421,017   5/1995   Scholz et al.   717/170
   5,495,612   2/1996   Hirayama et al. 709/331
   5,504,888   4/1996   Iwamoto et al.  707/200
   5,682,533  10/1997   Siljestroemer   707/200
   5,991,809  11/1999   Kriegsman       709/226 --
```

Signed and Sealed this

Sixteenth Day of September, 2003

JAMES E. ROGAN
*Director of the United States Patent and Trademark Office*